US012520402B2

United States Patent
Zhou et al.

(10) Patent No.: US 12,520,402 B2
(45) Date of Patent: Jan. 6, 2026

(54) LIGHTING ASSEMBLY

(71) Applicant: SIGNIFY HOLDING B.V., Eindhoven (NL)

(72) Inventors: Liwen Zhou, Shanghai (CN); Ye Feng, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 35 days.

(21) Appl. No.: 18/714,288

(22) PCT Filed: Dec. 1, 2022

(86) PCT No.: PCT/EP2022/083971
§ 371 (c)(1),
(2) Date: May 29, 2024

(87) PCT Pub. No.: WO2023/104614
PCT Pub. Date: Jun. 15, 2023

(65) Prior Publication Data
US 2025/0024574 A1    Jan. 16, 2025

(30) Foreign Application Priority Data

Dec. 7, 2021   (WO) ............... PCT/CN2021/136139
Mar. 8, 2022   (EP) .................................... 22160658

(51) Int. Cl.
*H05B 45/59*   (2022.01)
*H02M 1/00*   (2007.01)
(Continued)

(52) U.S. Cl.
CPC ............ *H05B 45/59* (2022.01); *H02M 1/008* (2021.05); *H05B 45/10* (2020.01); *H05B 45/325* (2020.01);
(Continued)

(58) Field of Classification Search
None
See application file for complete search history.

(56) References Cited

U.S. PATENT DOCUMENTS

| 8,946,935 B2 | 2/2015 | Nettelblad |
| 2003/0234581 A1 | 12/2003 | Gabriel |

(Continued)

FOREIGN PATENT DOCUMENTS

| EP | 2958402 A1 | 12/2015 |
| EP | 3102003 A1 | 12/2016 |

OTHER PUBLICATIONS

Middelstaedt, Lars, et al., "Investigation of the Root Cause of Electromagnetic Noise of an Interleaved DC-DC Converter With Can or Si Transistors and Corresponding Optimization Strategies," IEEE Journal of Emerging and Selected Topics in Power Electronics, vol. 8, No. 3, Sep. 2020 (16 Pages).

*Primary Examiner* — Anh Q Tran

(57) ABSTRACT

A lighting assembly comprises a first lighting arrangement with a first lighting unit board and a first switched mode driving unit and a second lighting arrangement with a second lighting unit board and a second switched mode driving unit. A parasitic capacitance is present between the first and second lighting unit boards. The switched mode driving units switches voltages on the lighting arrangements and said voltages generates a differential voltage across the parasitic capacitance and leads to a leakage current. A blocking arrangement is in a path between the first and second lighting arrangements and it blocks the leakage current flowing at least from one of the first and second lighting arrangements to the other of the first and second lighting arrangements via the parasitic capacitance due to the differential voltage between the driving units. In this way, disturbances to the current regulation function in one of (Continued)

the driving units, caused by a parasitic current flow from the other driving unit, is prevented.

15 Claims, 5 Drawing Sheets

(51) Int. Cl.
    *H05B 45/10*     (2020.01)
    *H05B 45/325*     (2020.01)
    *H05B 45/375*     (2020.01)
    *H05B 47/155*     (2020.01)

(52) U.S. Cl.
    CPC ......... *H05B 45/375* (2020.01); *H05B 47/155* (2020.01)

(56) References Cited

U.S. PATENT DOCUMENTS

| | | | |
|---|---|---|---|
| 2011/0115407 A1* | 5/2011 | Wibben | H05B 45/20 315/294 |
| 2012/0200229 A1* | 8/2012 | Kunst | H05B 45/385 315/186 |
| 2016/0205736 A1 | 7/2016 | Jin et al. | |
| 2020/0367344 A1 | 11/2020 | Natsuki | |

* cited by examiner

LIGHTING ASSEMBLY

CROSS-REFERENCE TO PRIOR APPLICATIONS

This application is the U.S. National Phase application under 35 U.S.C. § 371 of International Application No. PCT/EP2022/083971, filed on Dec. 1, 2022, which claims the benefit of European Patent Application No. 22160658.5, filed on Mar. 8, 2022 and International Application No. PCT/CN2021/136139, filed on Dec. 7, 2021. These applications are hereby incorporated by reference herein.

FIELD OF THE INVENTION

This invention relates to lighting assemblies, in particular a lighting assembly having multiple housings each with their own lighting board and lighting driver.

BACKGROUND OF THE INVENTION

Some lighting assemblies are very large and heavy, in order to enable the desired light output to be provided. In the case of ceiling lamps, the installation of such lighting assemblies becomes challenging. In particular, it is desired to enable installation by a single person.

For this purpose, it is known to divide the main body of the lighting installation into two (or more) parts which can be assembled in sequence. For example, one part may be a functional lighting unit, which aims to provide the desired output lumen level, and another part provides decorative (ambient) light. In another example, the two parts may be symmetrical and are a left half and a right half of a large ceiling light.

Each part has its own light source (typically a LED arrangement), but there may be a single main controller that is used to control both lighting installation parts.

FIG. 1 shows an example of a known lighting assembly 10.

There is a first housing 20 and a second housing 30. The first housing 20 receives the mains input ("AC220") and includes an AC/DC converter 22 as well as a main controller 24. The power supply Vcc generated by the AC/DC converter 22 is supplied to a first driver 26 which is controlled by a first driver controller 27, and this drives a light source arrangement on a first lighting board 28.

The second housing 30 receives the power supply Vcc generated by the AC/DC converter 22 via an electrical connection between the two housings. The power supply is supplied to a second driver 32 which is controlled by a second driver controller 34, and drives a light source arrangement on a second lighting board 36. The controller 24 may communicate with both lighting drivers 27, 32. More specifically, the controller 24 may communicate to the lighting driver 32 also via an control connection between the two housings, wherein the control connection and the electrical connection can be put into one multi-pin connector.

Although not preferred, unavoidably, there are parasitic capacitors Cr1, Cr2 between the lighting board and the metal housings 20, 30, since the lighting boards and the metal housings are so large. In the assembly, it is often the case that the metal housings are touching each other, namely the housings are electrically connected together. Thus the two lighting boards 28, 36, and hence the drivers, are coupled together, connected by parasitic capacitors Cr1, Cr2.

FIG. 2 shows the driver and lighting board circuits. Each driver comprises a switched mode power supply (in particular a buck converter) having a main control transistor Q1, Q3, an inductor L1, L2, a diode D1, D2 and a shunt switch, in particular a shunt transistor Q2, Q4. The first driver has a first main control transistor Q1 and a first shunt transistor Q2 and the second driver has a second main control transistor Q3 and a second shunt transistor Q4. The main control transistors are controlled by pulse width modulation signals PMW1, PWM3, generated by the respective driver controller and the shunt transistors are controlled by pulse width modulation signals PWM2, PWM4.

The first lighting unit board 28 has a first LED arrangement 280 and the second lighting unit board 36 has a second LED arrangement 360.

Thus, there are two PWM control signals generated by each driver controller. One PWM control signal controls the main power switch of the switched mode power supply, and thus controls the energy conversion function of the switched mode power supply. The other PWM control signal controls the shunt switch in parallel with the light source arrangement on the lighting board. The purpose of the shunt switch is to enable deep dimming. The two PWM signals may have a similar frequency due to the recent need of very deep dimming.

Thus, the first driver controller 27 has output signals PWM1 and PWM2, and the second driver controller 34 has output signals PWM3 and PWM4. The average/peak current of the buck converter is scaled with the duty cycle of PWM1 or PWM3; while the real LED current (i.e. dimming level) is scaled with the duty cycle of PWM2 or PWM4.

If only one of the first driver 26 or the second driver 32 is operating, the overall assembly is stable and the performance is good. This is because the other driver is completely off, more specifically the main power switch is off and all components are electrically float relative to the ground connection.

However, if both drivers 26, 32 are operating and for example the second shunt switch Q4, of the second driver, is turned on and off for deep dimming, it would make the first driver 26 not stable.

This is the condition shown in FIG. 2. When the second shunt switch Q4 is on, the cathode of the LED units 360 is level-shifted high to the input voltage; and when the main power switch Q1 is on, the cathode of the LED units 280 is coupled to the ground voltage, and the differential voltage causes current drawn as shown by the arrow 40 to be injected to the first driver. This parasitic current flow disturbs the first driver 26.

Specifically, the current flows into the inductor L1 of the first driver 26, without flowing to the light source 280 (or to a current sense resistor if the current sense resistor is at the high voltage side), thus the operating current of the first driver 26 comprises a component that is not monitored. This makes the output of the first driver 26 partially unregulated.

This gives rise to driver instability and hence lamp flickering. This is a particular issue when the parasitic capacitance (Cr1 and Cr2) is large, and the duty cycle is small. Thus, when the lamp is dimmed to a low dimming level (at one of the drivers), the lamp flickers (as a result of capacitive coupling to the other driver).

Even more, it may happen that the same situation will arise when the first shunt transistor Q2 is also turned on and off for deep dimming. In this case a reverse current flows from the first driver 26 through the parasitic capacitance (Cr1 and Cr2) to the second driver. The parasitic capacitances Cr1 and Cr2 are charged in alternate polarity and the leakage current will never stop.

The behaviors of the switches are shown by the signal waveforms in FIG. 3.

FIG. 3 shows the four PWM signals. Deep dimming is implemented in the second driver by PWM4, which has the shunt switch turned on for a large duty cycle. The overlap of a portion of this signal PWM4 with one of the on-pulses of the main control switch Q1 controlled by PWM1 is shown as area 42, and in this overlap, leakage current from the second driver to the first driver may occur.

A known way to solve this problem is to ensure synchronization between the shunt control signals of the two drivers (PWM2/PWM4) or to switch off the main control switch of one driver e.g. Q1 when the shunt switch of the other e.g. Q4 is conducting.

U.S. Pat. No. 8,946,935 discloses a power supply arrangement with multiple switched mode power supplies connected to an external device. To reduce interference, the switching frequency of the multiple power supplies is synchronized.

However, with independent systems in separate housings, the two drivers are controlled by different controllers so that synchronization is difficult to implement.

There is a need to address this flicker problem without requiring complex synchronization.

SUMMARY OF THE INVENTION

The invention is defined by the claims.

It is a concept of the invention to provide a lighting assembly having two lighting arrangements (each with a lighting unit board and a switched mode driving unit). A current flow between the switched mode driving units, through a parasitic capacitance, due to a differential voltage formed by switching of the first and the second switched mode driving units between the two lighting arrangements, is prevented by means of a blocking arrangement. This blocking arrangement allows normal current flow through the lighting units of the lighting unit boards but blocks a flow between the switched mode driving units, in one direction (e.g. from the second lighting arrangement to the first lighting arrangement) or more preferably in both directions.

According to examples in accordance with an aspect of the invention, there is provided a lighting assembly comprising:
- a first lighting arrangement comprising a first lighting unit board for mounting first lighting units, a first switched mode driving unit for driving the first lighting units and a first point, wherein the first switched mode driving unit is adapted to switch, at a particular moment, a first voltage potential to the first point;
- a second lighting arrangement comprising a second lighting unit board for mounting second lighting units, a second switched mode driving unit for driving the second lighting units, and a second point, wherein the second switched mode driving unit is adapted to switch, at the particular moment, a second voltage potential lower than the first voltage potential, by a differential voltage, to the second point,
- a parasitic capacitance present between the first point and second point; and
- a blocking arrangement coupled in a path between the first point of the first lighting arrangement and a second point of the second lighting arrangement, wherein the blocking arrangement is adapted for blocking a current flowing from one of the first and second lighting arrangements to the other of the first and second lighting arrangements via the parasitic capacitance which current is due to a differential voltage.

The blocking arrangement prevents a current flow into one driving unit that can result in flicker as explained above. The blocking arrangement is for example arranged to be reverse biased with respect to the differential voltage which arises during circuit operation, more specifically circuit switching, so as to block a current flowing from one driving unit to the other driving unit. This current flow is via the lighting unit board, so the path is for example from one switched mode driving unit to the other via the lighting boards and the parasitic capacitance.

The blocking arrangement may for example block current flow in one direction (from one switched mode driving unit to the other) when the differential voltages arising during operation of the two lighting arrangements, more specifically the switching of the switched mode driving units, cause a current flow in one direction. The blocking arrangement may instead block current flow in both directions between the first and second switched mode driving units.

The blocking arrangement is for example for blocking a current flowing from the first lighting unit board to the second switched mode driving unit or from the second lighting unit board to the first switched mode driving unit, via the parasitic capacitance.

In a further embodiment, the capacitance of the parasitic capacitance is between 1 nF and 100 nF. This capacitance is a typical value that would lead to substantial leakage current, and the present application is suitable for solving this problem.

The switching of the first and second switched mode driving units is for example asynchronized. Asynchronized switching of the first and second switched mode driving units may be one of the root causes of the voltage differential and sometime it is difficult to solve this root cause thus a remedy is needed. This is possible because the blocking arrangement means synchronization is not needed to prevent an undesired current flow.

More specifically, in the asynchronized switching, the first switched mode driving unit is for example adapted to switch, at a particular moment, the first voltage potential to an anode position of the parasitic capacitance, and the second switched mode driving unit is adapted to switch, at said particular moment, the second voltage potential to an cathode position of the parasitic capacitance, and the blocking arrangement is reverse biased from the effective anode position to the effective cathode position. Thus, the current flow that would result is blocked by the blocking arrangement.

The first switched mode driving unit for example comprises a first shunt switch in parallel with the first lighting unit, and the second switched mode driving unit comprises a second shunt switch in parallel with the second lighting unit.

The first shunt switch is adapted to switch an input voltage to the cathode of the first lighting units when the first shunt switch shunts the first lighting unit, and the second shunt switch is adapted to switch an input voltage to the cathode of the second lighting units when the second shunt switch shunts the second lighting unit.

These shunt switches are used for dimming control, to extend the dimming range provided by the switched mode driving units. They thus enable deep dimming. However, when the shunt switch is on, it directly bypasses the lighting units and connects the input voltage to the cathode of the lighting units, thereby level-shifting the cathode of the lighting units into a high voltage, which effectively creates a high potential (which may be troublesome). As explained above, at deep diming levels, there is a particular risk of asynchronized switching, resulting in unbalanced (differential) voltages between the two switched mode driving units, eventually leading to parasitic leakage currents causing.

The first switched mode driving unit for example comprises a first converter including a first power switching component adapted to couple a ground voltage to a point in the first converter, and the second switched mode driving unit comprises a second converter including a second power switching component adapted to couple a ground voltage to a point in the second converter.

At the particular moment, the first shunt switch is for example adapted to conduct and the power switching component of the second converter is adapted to conduct, thereby coupling the input voltage on the first lighting units with the ground voltage on the second converter via the parasitic capacitance.

In a second period of time, the second shunt switch is for example adapted to conduct when the power switching component of the first converter is adapted to conduct thereby applying the input voltage on the second lighting units to the ground voltage on the first converter.

Alternate leakage currents thus arise during these periods of time due to the alternate differential voltage during the switching of the converters, if the blocking component were not there. When a differential voltage alternates, the parasitic capacitance is charged into opposite polarity alternately so that the leakage current is always present. Thus the embodiment of the invention is specifically advantageous for preventing such problem.

The blocking arrangement for example comprises:
a first blocking element which is adapted to block current from the first shunt switch to the cathode of the first lighting unit; or
a first blocking element which is adapted to block current from the anode of the first lighting unit to the first shunt switch.

This first blocking element is thus part of the first lighting arrangement.

It should be noted that those skilled in the art would know that various differential voltages may be caused by asynchronized switching in different arrangements of the switched mode driving units, and those skilled in the art can analyze the places of various differential voltages and in turn place the blocking element at a suitable place. Therefore the above defined place of the blocking element is not unique and should not limit the scope of the invention as such.

The lighting assembly comprises a first board carrying the first switched mode driving unit, and the first blocking element may be mounted on the first lighting unit board or on the first board carrying the first switched mode driving unit. Thus, the first blocking element is between the first lighting units and the first shunt switch, and it may be on the first driving unit board (with the first shunt switch) or on the first lighting unit board (with the first lighting units).

The blocking arrangement may further comprise:
a second blocking element which is adapted to block current from the second shunt switch to the cathode of the second lighting unit; or
a second blocking element which is adapted to block current the anode of the second lighting unit to the second shunt switch.

This second blocking element is thus part of the second lighting arrangement. Thus current flow through the parasitic capacitance is blocked in both directions.

The lighting assembly comprises a second board carrying the second switched mode driving unit, and the second blocking element may be formed on the second lighting unit board or on the second board carrying the second switched mode driving unit. Thus, the second blocking element is between the second lighting units and the second shunt switch, and it may be on the second driving unit board (with the second shunt switch) or on the second lighting unit board (with the second lighting units).

The, or each, blocking element for example comprises a diode forwarded from the cathode of the lighting units to a current out terminal of the shunt switch, or a diode configured forwarded from a current in terminal of the shunt switch to an anode of the lighting unit. A diode-connected transistor or other unidirectional flow device may instead be used.

The first switched mode driving unit may comprise a first buck converter and the second switched mode driving unit comprises a second buck converter, wherein the first shunt switch is adapted to conduct when a power switching component of the second buck converter is adapted to conduct. The buck converter, when switching on, effectively switches a ground potential into the buck converter. This ground potential and the above mentioned high potential may form a differential voltage to create a sufficient leakage current via the parasitic capacitance. It should be understood that other types of converter may also have this technical problem and can be solved by a suitable implementation of the invention. Thus the scope of the invention is not be limited to buck converters.

The current flowing between the first and second lighting arrangements via the parasitic capacitance is preferably in a current loop different from a current loop flowing from a power input at one lighting arrangement to the other lighting arrangement.

This means that the built-in current control of the lighting arrangements, which usually couples the designed power in from the input, may not regulate the power in from the leakage current, and flicker may be caused since the power is not regulated. Therefore it is needed to use embodiments of the invention to block the current caused by the differential voltage.

The lighting assembly may comprise a first metal housing for the first lighting arrangement and a second metal housing for the second lighting arrangement, which housings contact each other, wherein the parasitic capacitance is formed between each lighting unit board and its respective metal housing.

The lighting unit board comprises a pad, and the parasitic capacitance is for example formed between:
a pad of the lighting unit board and a metal substrate of the lighting unit board which is electrically contacting the metal housing; or
a pad of the lighting unit board and the metal housing.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
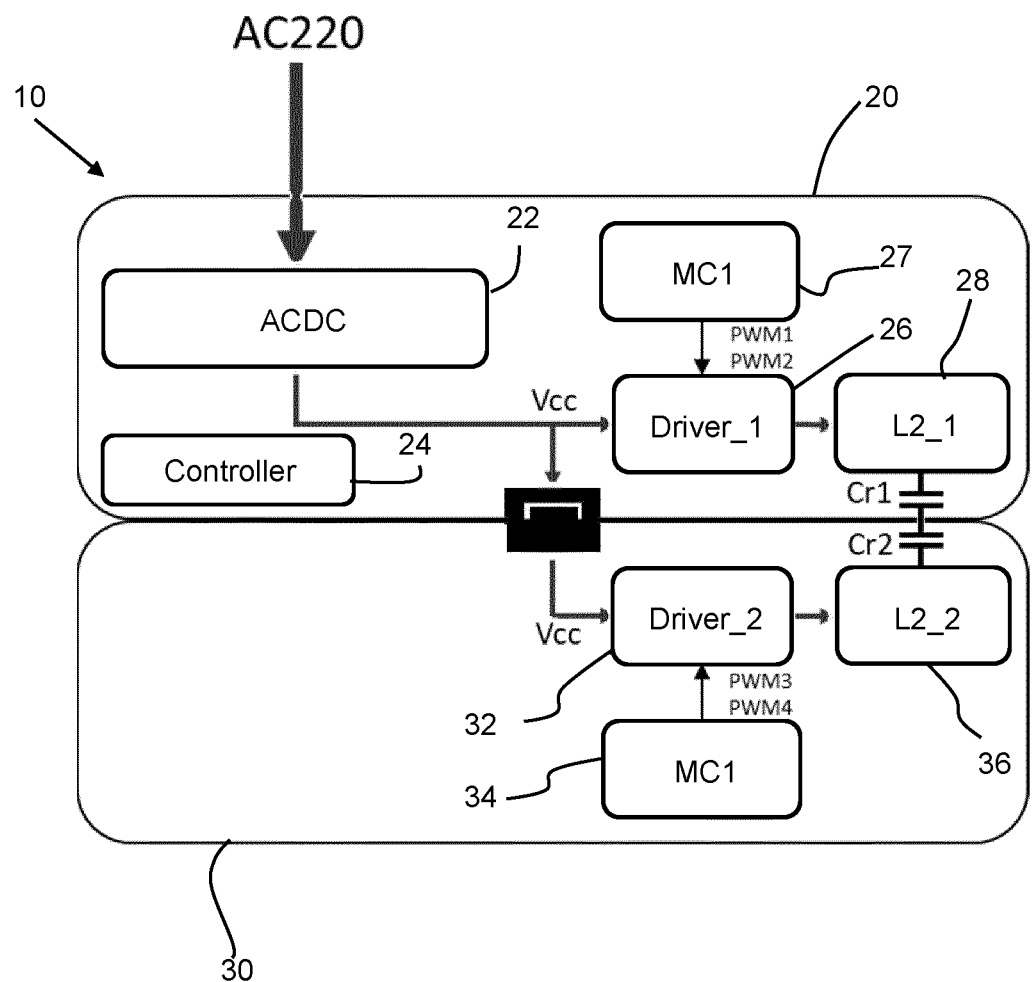
FIG. 1 shows an example of a known lighting assembly.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting assembly which comprises a first lighting arrangement (with a first lighting unit board and a first switched mode driving unit) and a second lighting arrangement (with a second lighting unit board and a second switched mode driving unit). A parasitic capacitance is present between the first and second lighting unit boards. A blocking arrangement is in a path between the first and second lighting arrangements (e.g. between the switched mode driving units) and it blocks a current flowing at least from one of the first and second lighting arrangements to the other of the first and second lighting arrangements via the parasitic capacitance due to a differential voltage between the driving units, which differential voltage is caused by switching of the first and second switched mode driving units. In this way, disturbances to the current regulation function in one of the driving units, caused by a parasitic current flow from the other driving unit, is prevented.

Figure 2:
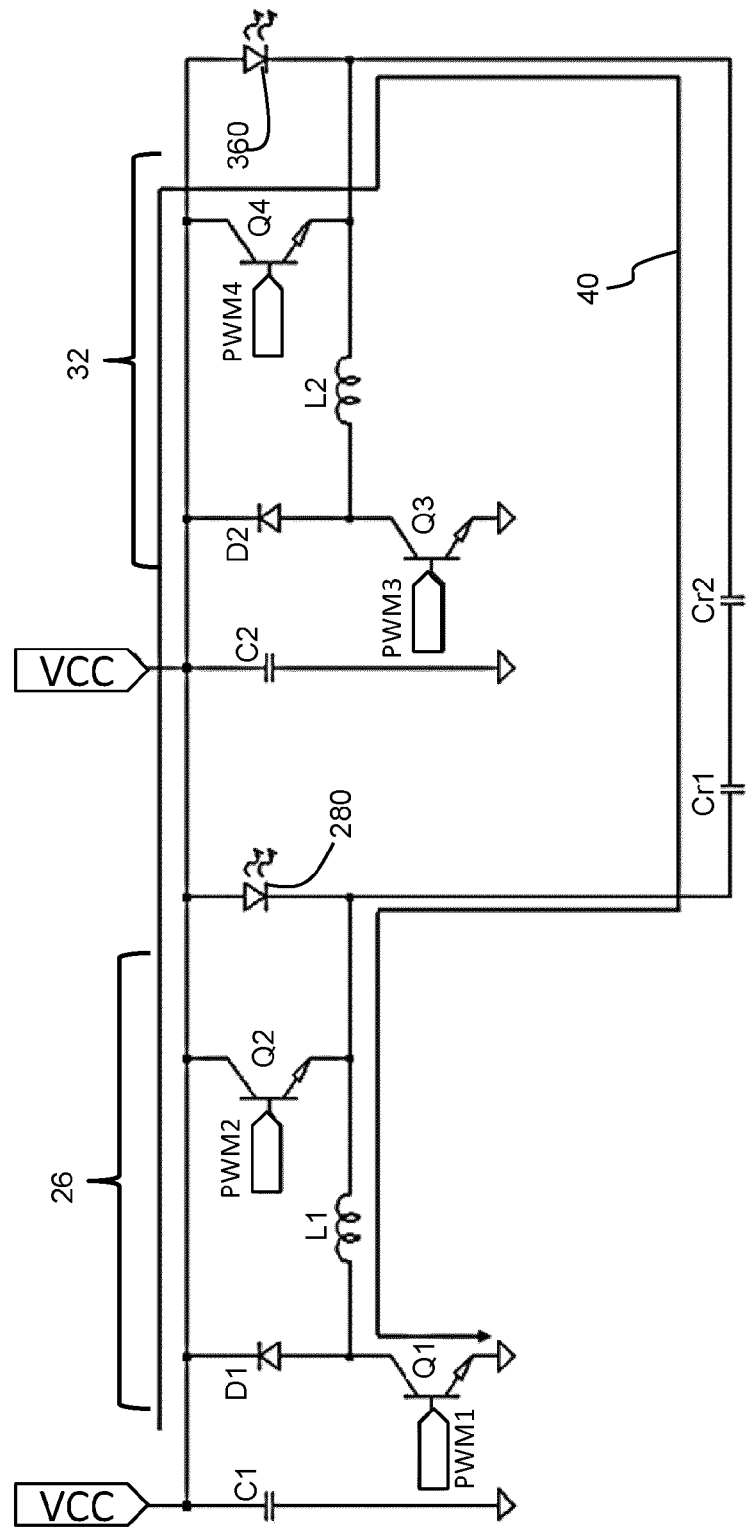
FIG. 2 shows the driver and lighting board circuits.

The invention is explained as a modification to the circuit of FIG. 2. However, the invention may be applied to other configurations of switched mode driving unit, and not only the buck converter configuration shown.

Figure 4:
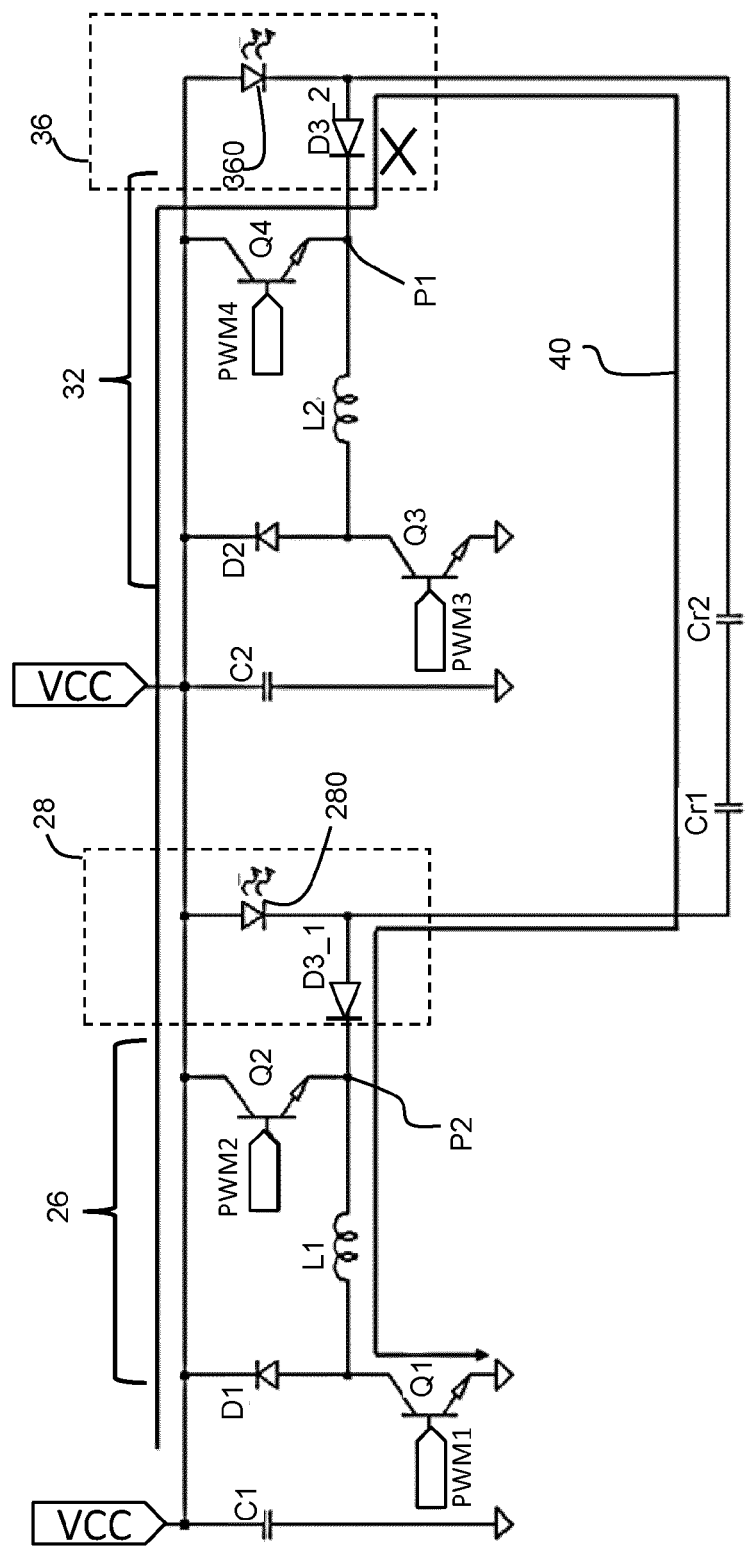
FIG. 4 shows one example of an implementation of the invention as a modification to FIG. 2.

FIG. 4 show one example of an implementation of the invention as a modification to FIG. 2.

As in FIG. 2, the lighting assembly has a first lighting arrangement comprising a first lighting unit board 28 for mounting first lighting units 280 and a first switched mode driving unit 26 for driving the first lighting units 280. A second lighting arrangement comprises a second lighting unit board 36 for mounting second lighting units 360 and a second switched mode driving unit 32 for driving the second lighting units 360. A parasitic capacitance Cr1, Cr2 is present between the first and second lighting unit boards 28, 36. More specifically, each lighting assembly has its own metal housing and they contact each other. The parasitic capacitance Cr1, Cr2 is for example formed between each lighting unit board and its respective metal housing. The parasitic capacitance may be formed between a pad of the lighting units and a metal substrate of the lighting unit board which is electrically contacting the metal housing. Alternatively or additionally, it may be formed between a pad of the lighting unit board and the metal housing. The capacitance of the parasitic capacitance Cr1, Cr2 is between 1 nF and 100 nF. Since the two housings are electrically contacting, the parasitic capacitance between the two lighting units boards is effectively a series connection of the capacitances Cr1 and Cr2.

The first switched mode driving unit 26 comprises a first main switch Q1 and a first shunt switch Q2 in parallel with the first lighting units 280. It also comprises a first inductor L1 and a first diode D1 connected in a buck converter configuration in this example. The second switched mode driving unit similarly comprises a second main switch Q2 and a second shunt switch Q4 in parallel with the second lighting units 360. It also comprises a second inductor L2 and a second diode D2 connected in a buck converter configuration in this example.

The parasitic conduction path 40 is again shown. However, the current flow from the second lighting arrangement to the first lighting arrangement is blocked by a blocking element D3_2 in the second lighting arrangement. This blocking element D3_2 is a part of a blocking arrangement. As a minimum, there is only one blocking element, i.e. D3_2 in this example.

The purpose of the blocking element D3_2 is to prevent current flowing from the second switched mode driving unit 32 to the first switched mode driving unit 26 when the second switched mode driving unit is driven at a deep dimming mode, and hence causing the first switched mode driver entering an abnormal mode. If it is ensured that the first switched mode driving unit is not used for deep dimming, then only the blocking element D3_2 is needed.

When the second shunt switch Q4 is on, the cathode of the LED units 360 is level-shifted high to the input voltage; and when the main power switch Q1 is on, the cathode of the LED units 280 is coupled to the ground voltage. But in this case, the blocking element D3_2 is reverse biased from the high input voltage to the ground voltage thus does not allow a leakage current to flow from the second switched mode driving unit to the first switched mode driving unit through the parasitic capacitance. The prevention of the current 40 is denoted by the icon X in FIG. 4.

In a preferred arrangement, there is an equivalent blocking element in both lighting arrangements. Thus, FIG. 4 shows a first blocking element D3_1 in the first lighting arrangement and a second blocking element D3_2 in the second lighting arrangement. As a result, current is blocked in both directions through the parasitic capacitance Cr1, Cr2. If both blocking elements D3_1 and D3_2 are provided, the control logic can be simpler.

The blocking arrangement prevents a current flow into one driving unit that can result in flicker as explained above. When one blocking component only is used, it is arranged to be reverse biased with respect to a differential voltage which arises during circuit operation, in particular during deep dimming, so as to block a current flowing from one driving unit to the other driving unit. When there is a single blocking element, it blocks current flow in one direction (from one switched mode driving unit to the other) when the differential voltages arising during operation of the two lighting arrangements causes a current flow in that one direction.

The blocking element operates at a time when the first switched mode driving unit switches a high voltage potential to an effective anode position of the parasitic capacitance, and at the same time the second switched mode driving unit switches a low voltage potential to an effective cathode position of the parasitic capacitance. At this time, the blocking component is reverse biased from the effective anode position to the effective cathode position to prevent the current flow as explained above.

Figure 3:
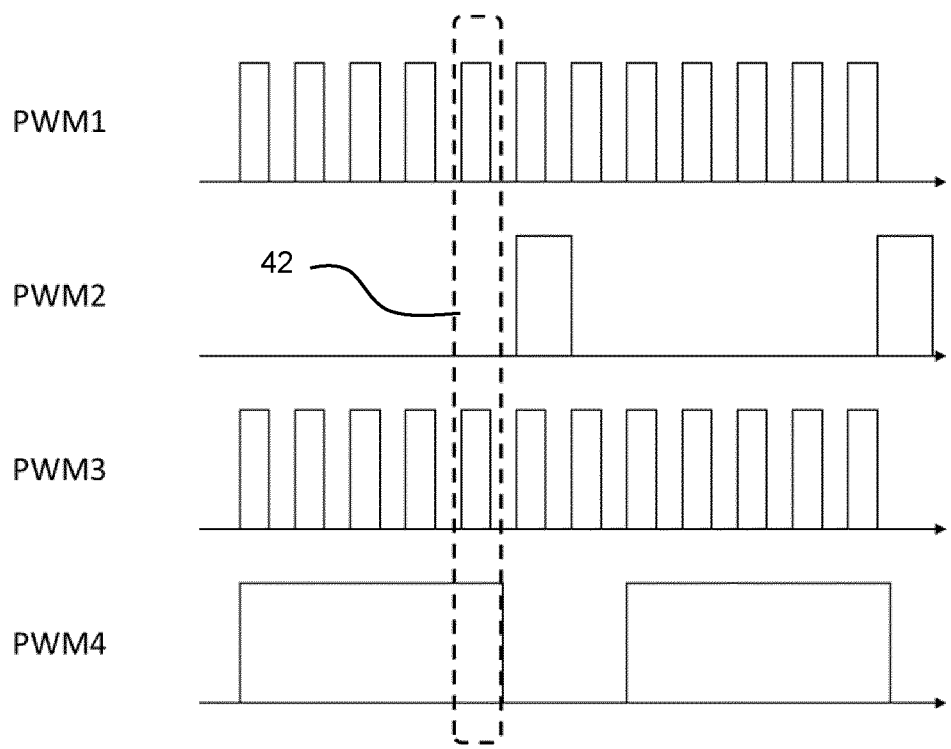
FIG. 3 shows the four PWM signals used in the lighting assembly of FIG. 1.

There is no required timing relationship between the four PWM signals shown in FIG. 3, and hence the two switched mode driving units may be operated in an asynchronized manner. To prevent one driver entering an abnormal mode (e.g. during time period 42 shown in FIG. 3) there are options:

(i) provide current blocking in both directions; and
(ii) provide current blocking in one direction only, but operate only one driver to provide a deep dimming level. The abnormal mode is most evident during deep dimming.

The preferred arrangement of FIG. 4 has two blocking elements so that the control is simpler.

The first blocking element D3_1 is reverse biased from the first shunt switch Q2 (the low voltage terminal) to the cathode of the first lighting units 280. It could however be reverse biased from the first shunt switch (the high voltage terminal) to the anode of the first lighting unit. The first blocking element may be formed on the first lighting unit board 28 (as shown in FIG. 4) or on a board of the first switched mode driving unit 26. Thus, the first blocking element is between the first lighting units 280 and the first shunt switch Q2.

The second blocking element D3_2 is reverse biased from the second shunt switch Q4 (the low voltage terminal) to the cathode of the second lighting units 360. It could however be reverse biased from the second shunt switch (the high voltage terminal) to the anode of the second lighting unit. The second blocking element may be formed on the second lighting unit board 36 (as shown in FIG. 4) or on a board of the second switched mode driving unit 32. Thus, the second blocking element is between the second lighting units 360 and the second shunt switch Q4.

The blocking elements preferably comprise diodes although other analogous devices may be used.

As mentioned above, there are different possible positions for the blocking element in one or both of the lighting arrangements.

Figure 5:
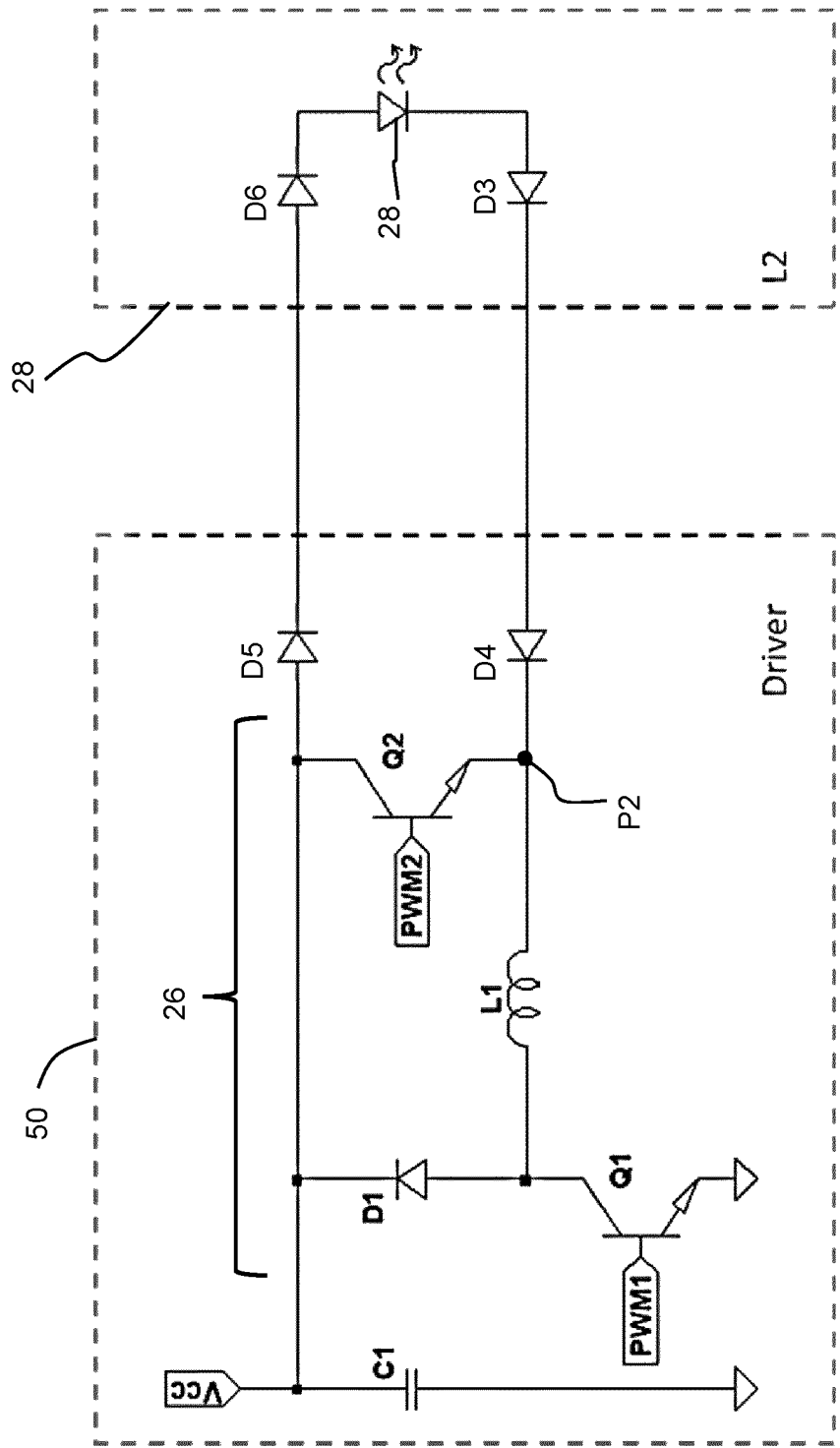
FIG. 5 shows four possible alternative diode positions, for the first lighting arrangement by way of example.

FIG. 5 shows four possible alternative diode positions, for the first lighting arrangement by way of example. Diode D3 corresponds to the positions of diodes D3_1 and D3_2 shown in FIG. 4, on the lighting board 28. Diode D4 has the same function but is on the driving unit board 50.

Diode D5 is on the driving unit board 50 but between the high voltage side of the shunt switch Q2 and the anode of the lighting units. Diode D5 is on the lighting unit board 28 and between the high voltage side of the shunt switch Q2 and the anode of the lighting units.

The invention has been described with reference to a lighting assembly with two lighting unit boards (two so-called L2 boards). However, the invention may be extended to a lighting assembly with many more lighting unit boards. By designing them all with a blocking element as described, conductive paths between any pair of L2 boards can be blocked.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lighting assembly comprising:
a first lighting arrangement comprising a first lighting unit board for mounting first lighting units, a first switched mode driving unit for driving the first lighting units, and a first point, wherein the first switched mode driving unit is adapted to switch, at a particular moment, a first voltage potential to the first point;
a second lighting arrangement comprising a second lighting unit board for mounting second lighting units, a second switched mode driving unit, different from the first switched mode driving unit, for driving the second lighting units and a second point coupled with the second switched mode driving unit, wherein the second switched mode driving unit is adapted to switch, at the particular moment, a second voltage potential lower than the first voltage potential, by a differential voltage, to the second point,
a parasitic capacitance present between the first point and the second point; and
a blocking arrangement coupled in a path between the first point and the second point wherein the blocking arrangement is configured for blocking a current flowing from the first point of the first lighting arrangement to the second point of the second lighting arrangement via the parasitic capacitance which current is due to the differential voltage.

2. The lighting assembly of claim 1, wherein the blocking arrangement is configured for blocking a current flowing from the first lighting unit board to the second switched mode driving unit,
the capacitance of the parasitic capacitance is between 1 nF and 100 nF,
the blocking arrangement is configured for blocking the current flowing from the first point of the first lighting arrangement into the second switched mode driving unit via the parasitic capacitance,
wherein the current is in a current loop different from a current loop flowing from a power input to the second switched mode driving unit, or is not monitored by the second switched mode driving unit.

3. The lighting assembly of claim 1, wherein switching of the first and second switched mode driving units is asynchronized in switching different voltages on the first point and the second point at the same particular moment.

4. The lighting assembly of claim 3, wherein the first point is coupled to an anode position of the parasitic capacitance, and the second point is coupled to a cathode position of the parasitic capacitance.

5. The lighting assembly of claim 4, wherein the first switched mode driving unit comprises a first shunt switch in parallel with the first lighting units and adapted to switch an input voltage to a cathode of the first lighting units when the first shunt switch shunts the first lighting unit, and
the second switched mode driving unit comprises a second shunt switch in parallel with the second lighting units and adapted to switch an input voltage to a cathode of the second lighting units when the second shunt switch shunts the second lighting unit.

6. The lighting assembly of claim 5, wherein the first switched mode driving unit comprises a first converter including a first power switching component adapted to couple a ground voltage to a point in the first converter, and the second switched mode driving unit comprises a second converter including a second power switching component adapted to couple a ground voltage to a point in the second converter.

7. The lighting assembly of claim 6, wherein at the particular moment the first shunt switch is adapted to conduct and the power switching component of the second converter is adapted to conduct thereby coupling the input voltage onto the first lighting units and coupling the ground voltage onto the second converter, the input voltage and the ground voltage are across the parasitic capacitance but are isolated from each other by the a reverse biasing of the blocking arrangement.

8. The lighting assembly of claim 6, wherein the first converter comprises a buck converter and the second converter comprises a buck converter.

9. The lighting assembly of claim 5, wherein the blocking arrangement comprises a first blocking element which is adapted to block current from the first shunt switch to the cathode of the first lighting units; or block current from the anode of the first lighting units to the first shunt switch.

10. The lighting assembly of claim 9, wherein the lighting assembly comprises a first board carrying the first switched mode driving unit, and
the first blocking element is amounted on the first lighting unit board or on the first board carrying the first switched mode driving unit.

11. The lighting assembly of claim 9, wherein the blocking arrangement further comprises a second blocking element which is adapted to block current from the second shunt switch to the cathode of the second lighting units; or block current the anode of the second lighting units to the second shunt switch.

12. The lighting assembly of claim 11, wherein the lighting assembly comprises a second board carrying the second switched mode driving unit, and
the second blocking element is amounted on the second lighting unit board or on the second board carrying the second switched mode driving unit.

13. The lighting assembly of claim 9, wherein the, or each, blocking element comprises a diode forward biased from the cathode of the lighting units to a current out terminal of the shunt switch, or
a diode configured forward biased from a current in terminal of the shunt switch to an anode of the lighting unit.

14. The lighting assembly of claim 1, comprising a first metal housing for the first lighting arrangement and a second metal housing for the second lighting arrangement, which housings electrically contact each other, wherein the parasitic capacitance is formed between each lighting unit board and its respective metal housing.

15. The lighting assembly of claim 14, wherein the lighting unit board comprises a pad, and the parasitic capacitance is formed between:
the pad of the lighting unit board and a metal substrate of the lighting unit board which is electrically contacting the metal housing; or
the pad of the lighting unit board and the metal housing.

* * * * *